United States Patent [19]

Webb, Jr.

[11] 4,422,444
[45] Dec. 27, 1983

[54] SOLAR ENERGY CONTROL SYSTEM AND METHOD

[76] Inventor: William Webb, Jr., 272 A S. Monaco Pkwy., Denver, Colo. 80224

[21] Appl. No.: 247,661

[22] Filed: Mar. 26, 1981

[51] Int. Cl.³ .............................................. F24J 3/02
[52] U.S. Cl. .................................... 126/422; 126/428; 126/436; 236/91 F
[58] Field of Search ...................... 126/422, 428, 436; 236/91 F; 62/235.1

[56] References Cited

U.S. PATENT DOCUMENTS

| | | | |
|---|---|---|---|
| 2,713,252 | 7/1955 | Jackson et al. | 62/235.1 X |
| 3,931,806 | 1/1976 | Hayes | 126/422 |
| 4,184,635 | 1/1980 | Bloomfield | 126/436 X |
| 4,286,575 | 9/1981 | Gates | 126/422 |
| 4,304,219 | 12/1981 | Currie | 126/422 |

*Primary Examiner*—William E. Wayner
*Attorney, Agent, or Firm*—O'Rourke & Harris

[57] ABSTRACT

An improved solar energy control system and method are disclosed that enables efficient utiliziation of heat produced from solar energy in heating air and/or water. The system and method sense the availability of heat along with the need for such heat at monitored areas and, responsive thereto, selectively directs the heat to the monitored areas as necessary to cause the temperature in each area to be increased to predetermined levels. To most efficiently utilize heat derived from a solar collector, the heat initially made available from the collector is directed to the water within a temperature monitored water heater when the water is sensed to be at a temperature lower than the air in a temperature monitored room. The heat available from the collector is directed to the air in the temperature monitored room when sufficient heat is sensed to be available at the collector to heat the room and such heat application is continued until the temperature of the monitored room reaches a preselected temperature, after which the heat from the collector is directed to the water in the water heater until the water temperature is increased to a preselected temperature, and then the heat from the collector is directed to the air in the monitored room until the temperature of the monitored room is increased to a preselected temperature higher than the first preselected room temperature. The control system includes visual displays for indicating sensed temperatures, determined capabilities and/or needs. Improved probes are also disclosed for sensing of air, water and collector temperatures.

28 Claims, 18 Drawing Figures

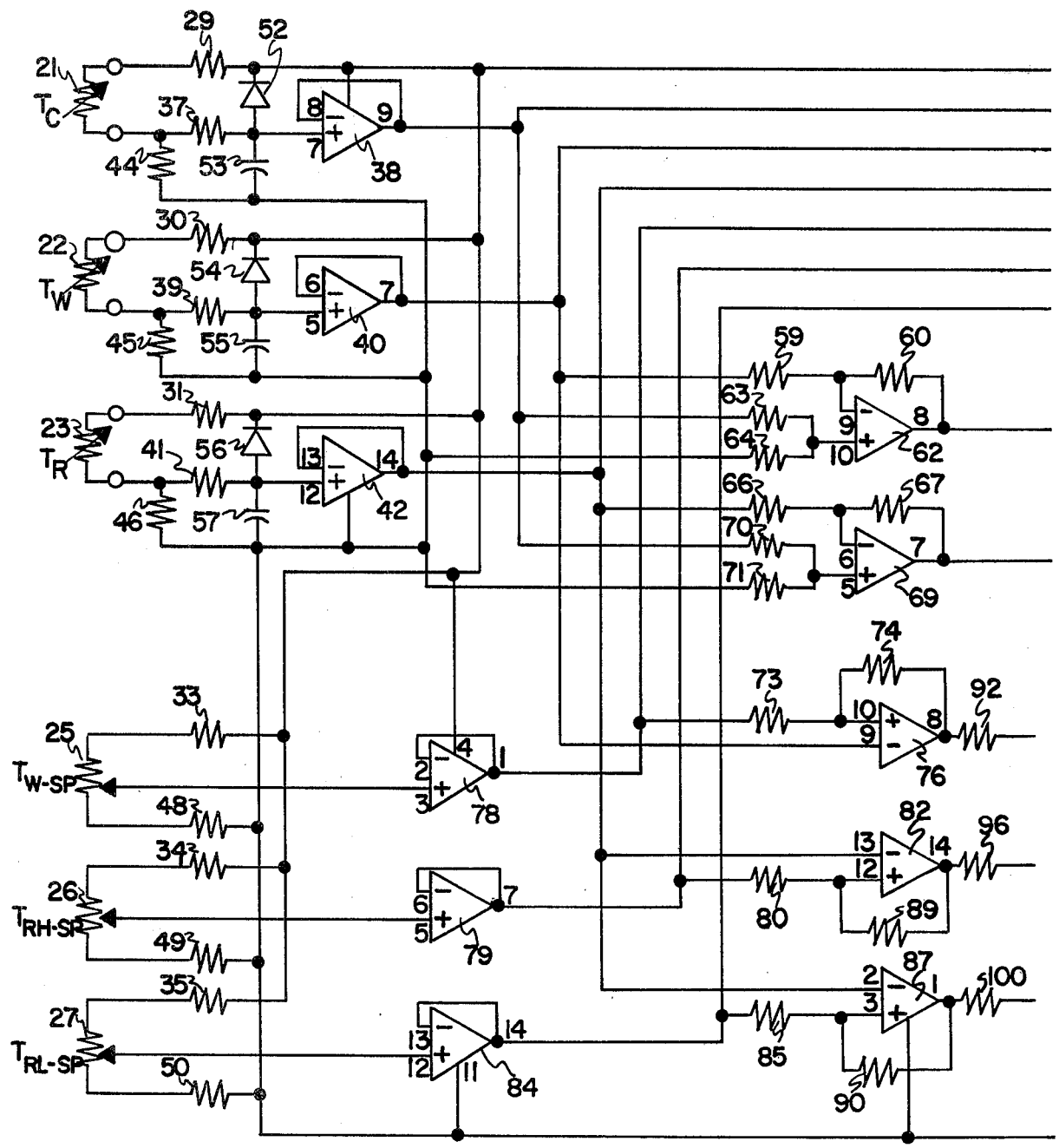
FIG. IA

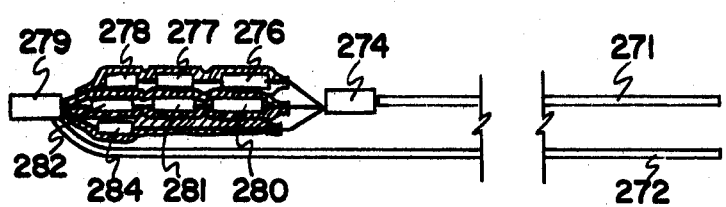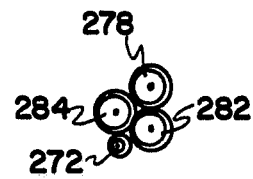
FIG. 6    FIG. 7
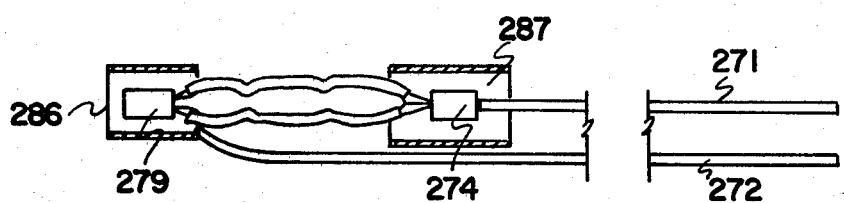
FIG. 8
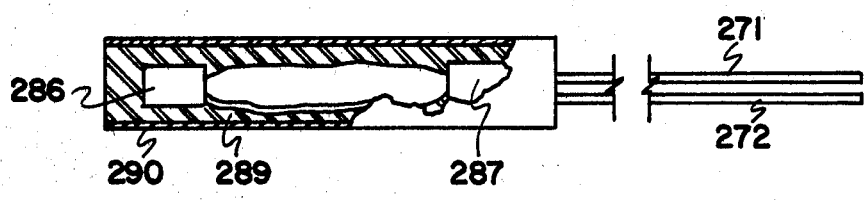
FIG. 9
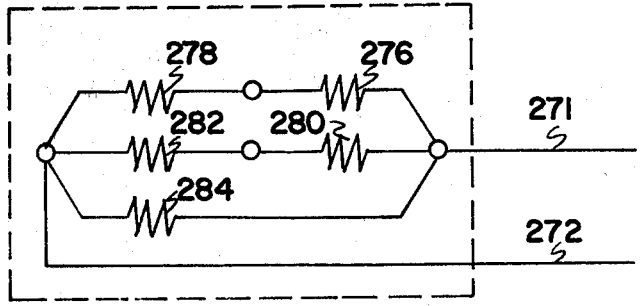
FIG. 10

SOLAR ENERGY CONTROL SYSTEM AND METHOD

FIELD OF THE INVENTION

This invention relates to a control system and method and, more particularly, relates to a solar energy control system and method.

BACKGROUND OF THE INVENTION

The need for generation and application of heat is necessary, or at least desirable, in many diverse manners and degrees, including the application of heat to defined areas such as a room or rooms used for living quarters and/or a water heated used to provide hot water for living quarters. Various systems have been developed to generate and provide heat to both room air and water within a water heater, and some such systems have been heretofore provided with a control system for maintaining the room air or water at preselected temperatures.

More recently, solar collectors and associated systems have been developed and/or utilized to take advantage of solar energy and collect therefrom heat which has then been utilized, directly or indirectly, for heating air and/or water. As is well known, the direct availability of heat from solar energy is essentially limited to those periods when sun rays can be, and are, directed to a solar collector the heat availability from which varies in intensity from a minimum (essentially zero) in early morning before the sun rays are directed to the collector, to a maximum during midday, and then again to a minimum after the sun rays no longer reach the collector in late afternoon.

In an effort to better utilize the heat derived from solar energy, control units have been heretofore developed of direct application of such heat to both air and water. Such control units have not, however, been completely successful, at least in some instances, in efficiently directing the applications of such heat to air and/or water, have not provided a control system capable of satisfactorily sensing differing heat needs, and/or have not provided a control system capable of satisfactorily interpreting and satisfying the application of needed or desired heat in the most efficient manner.

SUMMARY OF THE INVENTION

This invention provides an improved control system and method that are particularly useful as a solar energy control system and method. The availability of heat from solar energy is sensed, as is the temperature of selected elements such as air and/or water, and the derived information utilized to automatically control application of heat to the selected element in a predetermined manner to best and most efficiently utilize such heat.

It is therefore an object of this invention to provide an improved control system and method.

It is another object of this invention to provide an improved solar energy control system and method.

It is still another object of this invention to provide an improved electronic solar energy system and method capable of automatically controlling application of heat to selected elements.

It is still another object of this invention to provide an improved solar energy control system capable of sensing heat availability and application needs and responsive thereto directing application of heat in the most efficient manner.

It is still another object of this invention to provide an improved solar energy control system having improved probes for sensing the temperature of preselected elements.

It is yet another object of this invention to provide an improved solar energy control system having a visual display of sensed temperatures, set point temperatures, availability and/or need.

With these and other objects in view, which will become apparent to one skilled in the art as the description proceeds, this invention resides in the novel construction, combination, arrangement of parts and method substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the application of the principles thereof, and in which:

FIG. 6 is a side view layout diagram of a probe utilized to sense the temperature of elements such as water or air;

FIG. 7 is a cross section of the probe shown in FIG. 6;

FIG. 8 is a side view showing the probe of FIG. 6 in a partially assembled state;

FIG. 9 is a partially cut away view of the assembled probe as shown in FIGS. 6 through 8;

FIG. 10 is an electrical schematic of the probe shown in FIGS. 6 through 9;

DESCRIPTION OF THE INVENTION

Figure 1B:
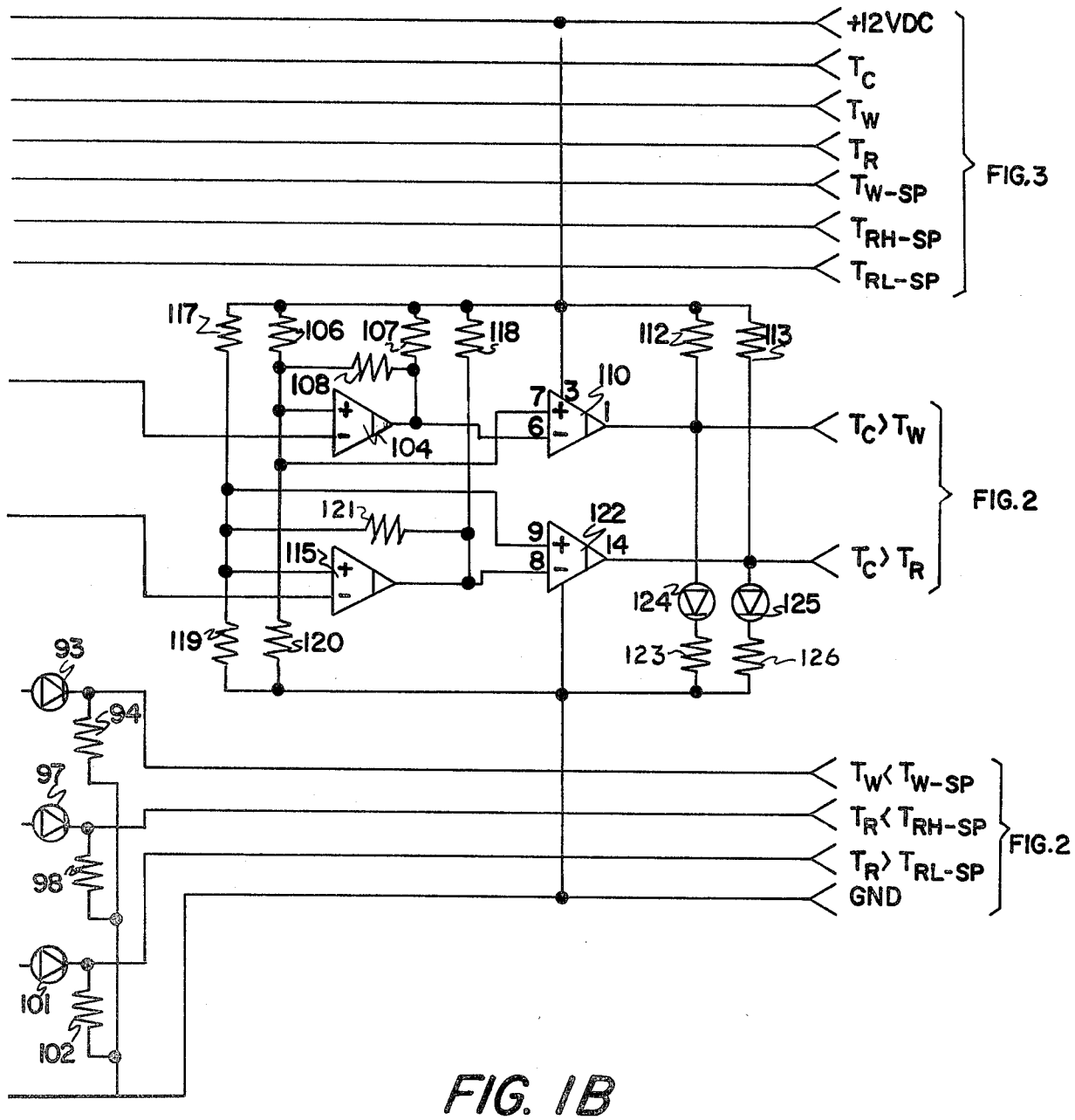
FIGS. 1, 2 and 3 (FIGS. 1 and 2 consist of FIGS. 1A and 1B and 2A and 2B, respectively, which are positioned with FIG. 1A to the left of FIG. 1B and FIG. 2A to the left of FIG. 2B to form a composite of FIGS. 1 and 2, respectively) taken together form a schematic presentation of the control system of this invention.
Figure 2A:
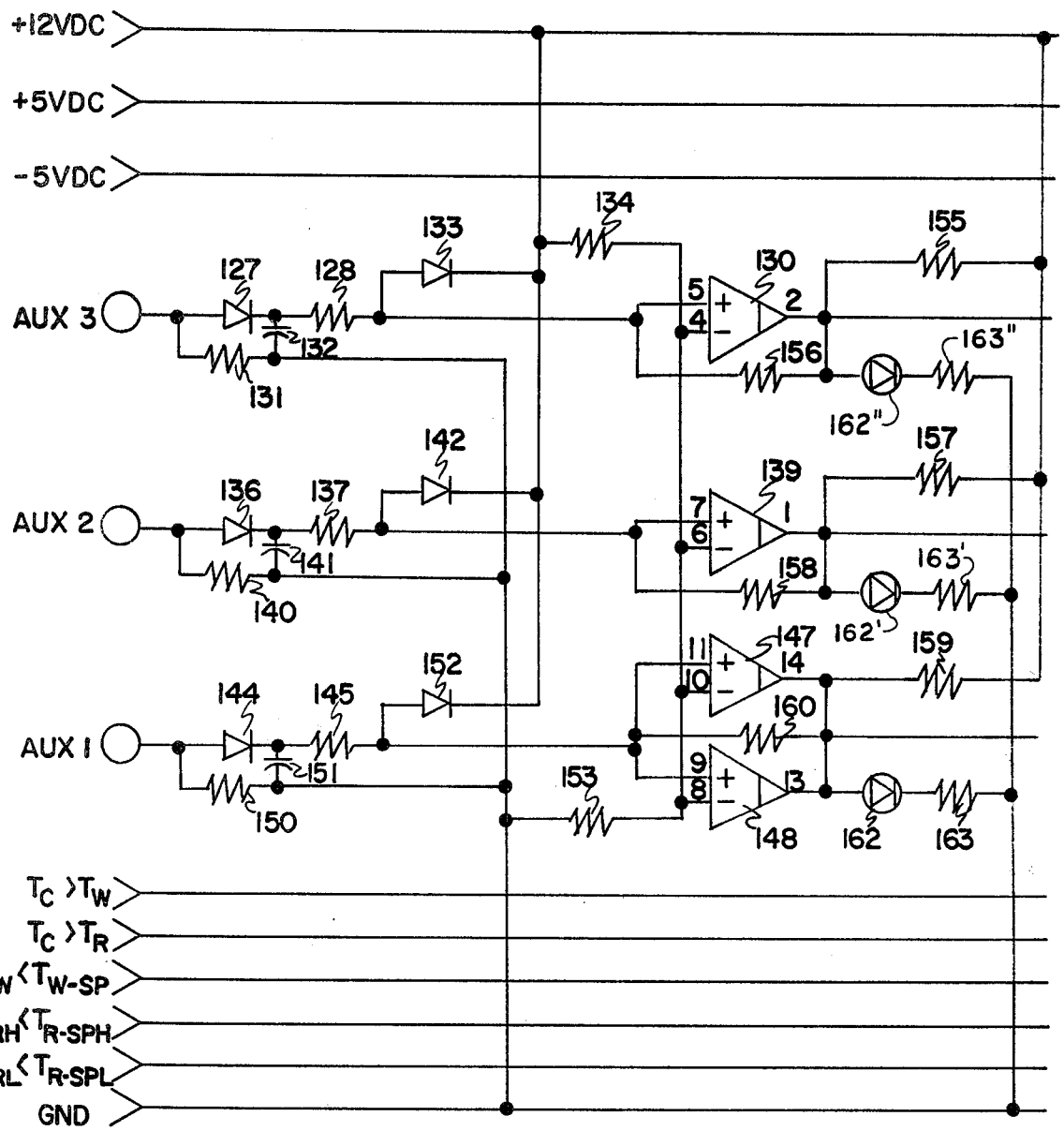
Figure 2B:
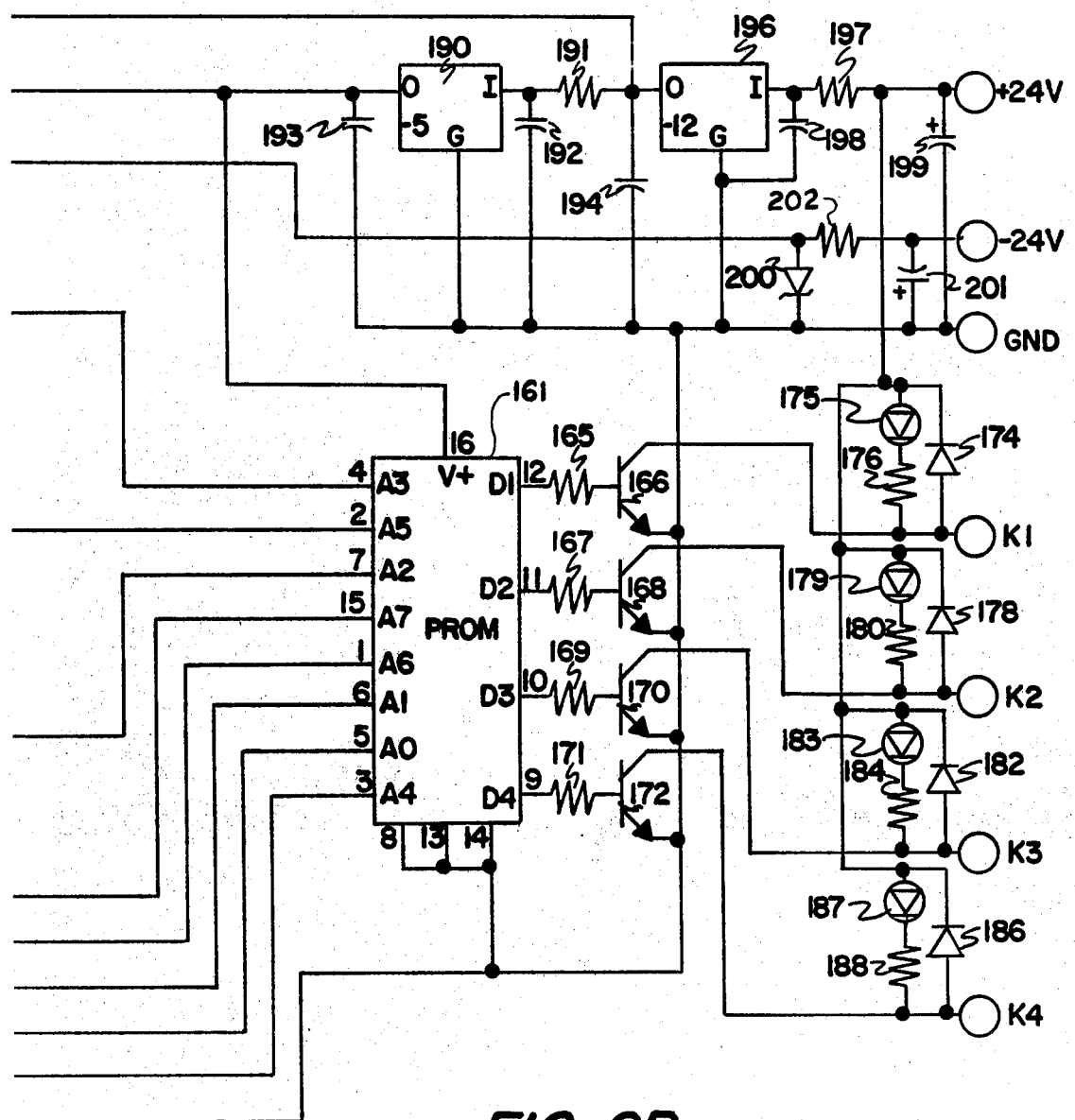
Figure 3:
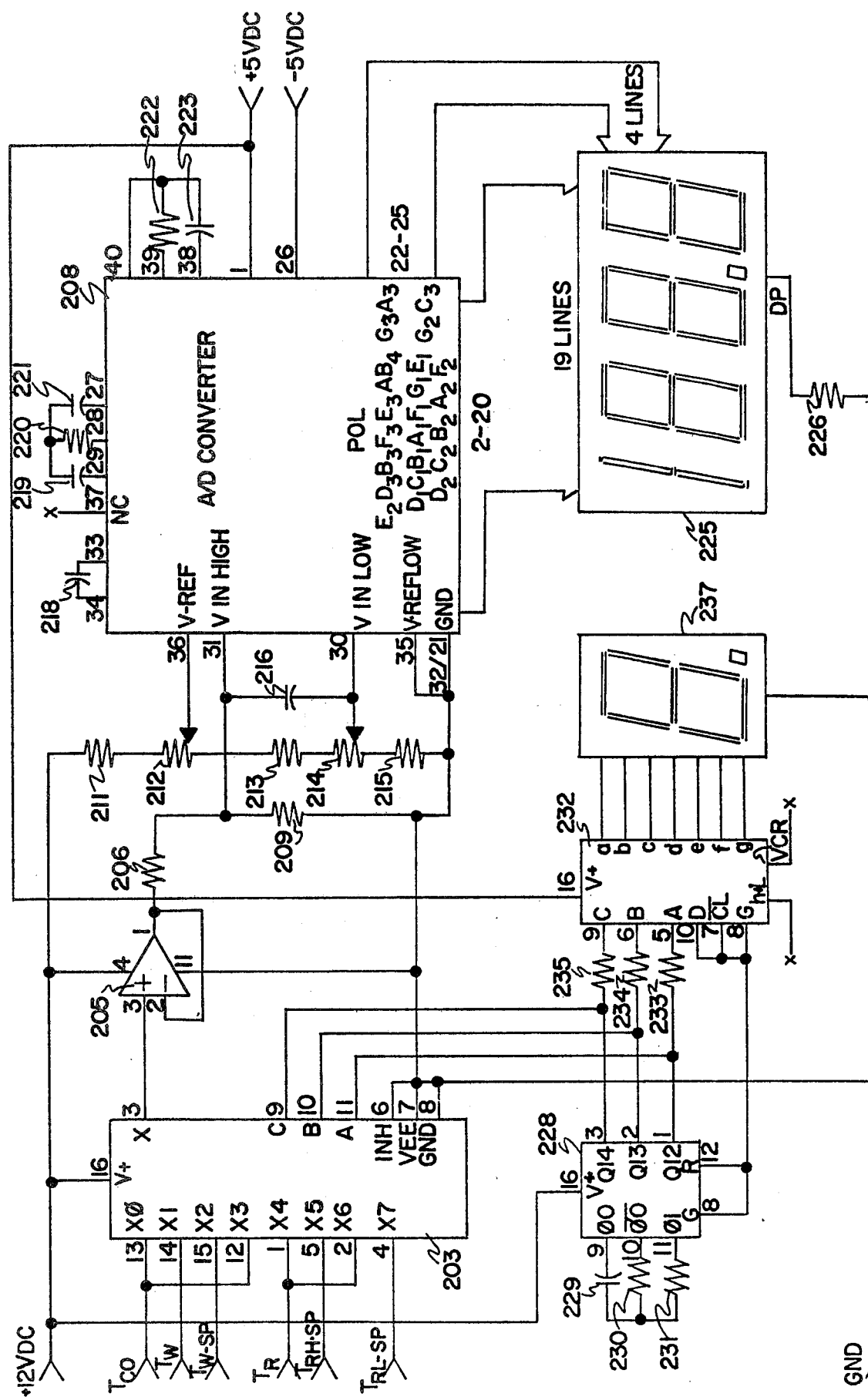

The control system 17 of this invention is shown by the combined schematic diagrams of FIGS. 1 through 3.

In essence, the control system and method of this invention directs the application of heat in the most efficient manner from a conventional solar collector 18 to different elements (such as air in a room 19 and water in a water heater tank 20) to increase the temperature level of such elements.

The ability of a solar collector to provide heat to a transport medium (usually a gas or fluid such as air or water) passing through the collector is dependent, at least in part, upon the rays of the sun being directed at the collector and the collector being positioned to receive such rays, as is well known.

Since solar collectors are normally maintained at a fixed operational position and normally have the ability to produce maximum heat when the sun rays are received normal to the plane of the collector, such collectors are usually positioned so that sun rays are normal to the plane of the detector during the period of maximum energy availability (usually between about 10 a.m. and 2 p.m.). This means, of course, that the available energy that can be captured by such a collector is at a minimum both early in the morning and late in the afternoon. It might be noted that a tracking collector, while able to follow the sun, still provides maximum available energy at midday and the available energy is reduced in early morning and late afternoon and hence such a collector likewise has periods of low energy output.

The efficiency of a fixed position solar collector varies over the daily period of sunlight with the efficiency decreases as $T_{in} - T_A/I_T$ increases, where $I_T$ equals the amount of solar energy received by the collector and expressed in BTU/Ft$^2$/Hr, $T_{in}$ equals the temperature of the transport medium at the collector inlet, and $T_A$ equals the ambient temperature outside the collector.

From the foregoing, it can be seen that if $T_{in} - T_A$ is decreased, the efficiency of the collector is increased which is particularly important during the early morning and late afternoon hours when the availability of solar energy is reduced as compared to midday. The control system of this invention, to most efficiently utilize the sun rays, selects the lower temperature for heating (to thus reduce $T_{in} - T_A$), particularly during the early morning and late afternoon hours.

The control system of this invention, as shown in FIGS. 1 through 3, selects and sequentially causes heat to be directed in phases to water and air.

During phase 1, the early morning sun, which has limited energy, is utilized to preheat water only until the collector is hot enough to heat the room (on a cloudy day enough heat may be produced only to heat water). During phase 2, the heat from the solar collector is utilized to heat the room air to the lower limit set point, which set point is normally 2° to 4° above the normal thermostat set point for a furnace (utilizing other forms of energy that could be utilized when solar heat is not available) to prevent the furnace from turning on when there is sun available to produce heat at the solar collector for heating the house. During phase 3, when the house has been heated to the room low limit set point and solar energy is available, the control system then causes the heat from the solar collector to be directed back to the water to heat the water to the water set point. If the temperature in the room should drop below the set point as established in phase 2, the system will cause the heat in the room to be raised to the lower set point and then resume heating the water to the water set point which would normally be in the range of 100° to 110° F. during winter operation. Then, for phase 4, when the water has been raised to the temperature of the water set point, the heat from the solar collector will be utilized to heat the room air to the upper limit set point which is normally the final room air temperature desired (which also allows the room or rooms of the house to be used as a heat storage area).

In other words, if water in a temperature monitored water heater, for example, is sensed to be at a temperature less than the air in a temperature monitored room, heat initially available from the solar collector is applied to the water until the temperature of the water is increased to near room temperature. When the control system senses that sufficient heat is available to heat the air of a temperature monitored room, heat from the solar collector is diverted from the water and supplied to the air to heat the monitored room. If the water was not initially at a lower temperature than the monitored room, then the air in the monitored room would be heated without prior water heat.

The room air is heated until a preselected set point is reached as determined by a thermostat or equivalent electronic circuit, for example, in the room, the set point being preferably lower than the desired final room temperature. When the set point is reached, the control system causes the heat to be diverted from the room air and applied to the water in the water heater and such heating is continued until the water in the water heater is heated to a set point as determined by a thermostat or equivalent electronic circuit, for example, in the water heater. During this period, if the monitored room air should fall below the lower set point, the system will cause interruption of water heating to heat the room air to the lower set point and then resume water heating.

When the temperature of the water in the water heater reaches the set point, the heat is diverted from the water by the control system and applied to the air in the monitored room to increase the temperature of the air to a higher set point. When this higher set point is reached, the control system has satisfied all of the heating needs of the monitored elements, and the control system terminates application of heat to the elements until such time as a new need for heat is sensed. When this occurs, the heating cycle is repeated so long as solar heat is available.

While not specifically shown, heating of multiple elements could be carried out simultaneously if sufficient heat is available from the collector.

Referring now to FIG. 1A, three probes are shown schematically as variable resistances 21, 22 and 23, for sensing the temperature of the collector ($T_C$), the temperature of the water ($T_W$), and room temperature ($T_R$), respectively. Probes 21, 22 and 23, which are shown in more detail hereinafter, are designed to provide a non-linear resistance output which is coupled through associated circuitry to provide an output that is a linear voltage as a function of temperature.

Three set points to establish temperature limits are provided and are indicated as potentiometers 25, 26 and 27 in FIG. 1A, for establishing set points $T_{W\text{-}SP}$, $T_{RH\text{-}SP}$, and $T_{RL\text{-}SP}$, respectively.

As shown in FIG. 1, one side of variable resistances 21, 22 and 23 and one side of potentiometers 25, 26 and 27 are connected to the $+12$ volt DC power supply through resistors 29, 30, 31, 33, 34 and 35, respectively. The other side of variable resistance 21 is connected through resistor 37 to the positive input of differential amplifier 38, the other side of variable resistance 22 is connected through resistor 39 to differential amplifier 40, and the other side of variable resistance 23 is connected through resistor 41 to differential amplifier 42. In addition, the junctions of resistance 21 and resistor 37, resistance 22 and resistor 39, resistance 23 and resistor 41, and the other sides of potentiometers 25, 26 and 27 are connected with ground through resistors 44, 45, 46, 48, 49 and 50, respectively. In addition, the positive input to differential amplifiers 38, 40 and 42 are connected with the +12 volt DC power supply and with ground through diodes 52, 54 and 56 and capacitors 53, 55 and 57, respectively.

Resistors 29, 30 and 31 provide short circuit protection and static discharge protection; resistor 37, diode 52 and capacitor 53, resistor 39, diode 54 and capacitor 55, and resistor 41, diode 56 and capacitor 57 provide filtering and static discharge protection; and the linear voltage signal is developed across resistors 44, 45 and 46. In addition, differential amplifiers 38, 40 and 42 act as buffers, have a gain of 1, and have high impedance at the input with a low impedance at the output.

The output from differential amplifier 40 ($T_W$) is coupled through resistor 59 to resistor 60 and to the negative input of differential amplifier 62 (resistor 60 being connected between the output and negative input of differential amplifier 62). The positive input of differential amplifier 62 is connected with the output from differential amplifier 38 ($T_C$) through resistor 63 and with ground through resistor 64. The output from differential amplifier 42 ($T_R$) is coupled through resistor 66 to resistor 67 and to the negative input of differential amplifier 69 (resistor 67 being connected between the output and negative input of differential amplifier 69). The positive input of differential amplifier 69 is connected through resistor 70 to the output of differential amplifier 38 ($T_C$) and with ground through resistor 71. Amplifier 62 and 69 are linear differential amplifiers for ground reference.

The set point indication $T_{W-SP}$ is coupled through resistor 73 to resistor 74 and the positive input of differential amplifier 76 (resistor 74 being connected between the output and positive input of differential amplifier 76), the input indication being coupled through differential amplifier 78. The set point indication $T_{RH-SP}$ is coupled through differential amplifier 79 and resistor 80 to the positive input of differential amplifier 82, while the set point indication $T_{RL-SP}$ is coupled through differential amplifier 84 and resistor 85 to the positive input of differential amplifier 87. Differential amplifiers 82 and 87 have resistors 89 and 90, respectively, between the output and positive input.

The output from differential amplifier 76 is coupled through resistor 92 and LED 93 as an indication of $T_W$ less than $T_{W-SP}$ (LED 93 having a resistor 94 to ground), the output from differential amplifier 82 is coupled through resistor 96 and LED 97 as an indication of $T_R$ lesss than $T_{RH-SP}$ (LED 97 having a resistor 98 to ground), and the output from differential amplifier 87 is coupled through resistor 100 and LED 101 as an indication of $T_R$ less than $T_{RL-SP}$ (LED 101 having a resistor 102 to ground). These indications provide indications of what must be done with respect to heat and water heating in order to meet the indicated needs as established by the variable set points. The LEDs, when energized, indicate that the temperatures are not then up to the established set points.

The output from differential amplifier 62 is coupled to the negative input of $\Delta T$ comparator 104, which comparator has the positive input connected with the +12 volt DC power supply through resistor 106, the output connected with the +12 volt DC power supply through resistor 107, and the positive input and the output connected through resistor 108. The output from comparator 104 is coupled to the negative input of comparator 110, the positive input to which is coupled from the +12 volt DC power supply through resistor 106. The output from comparator 110 is coupled from the circuit as an indication of $T_C$ greater than $T_W$, and the output is connected to the +12 volt DC power supply through resistor 112 (which has a like resistor 113 to the room $\Delta T$ comparison path).

The positive input of $\Delta T$ comparator 115 is connected with the +12 volt DC power supply through resistor 117, the output is connected with the +12 volt DC power supply through resistor 118, and the positive input is connected with ground through resistor 119 (the positive input of comparator 104 is also connected with ground through resistor 120). In addition, the output and positive input of comparator 115 are connected through resistor 121. The negative input to comparator 115 is provided from the output of differential amplifier 69 and the output from comparator 115 is coupled as the negative input to comparator 122 which receives as a positive input the +12 volt DC power supply through resistor 117. The output of comparator 122 is coupled from the circuit as an indication of $T_C$ greater than $T_R$.

The output of comparator 110 is connected with ground through resistor 123 and LED 124, while the output of comparator 122 is connected with ground through LED 125 and resistor 126. $\Delta T$ comparators 104 and 115 are comparators with hysteresis, while comparators 110 and 122 act as level shifters from 12 volts to 5 volts out. The outputs from level shifters 110 and 122 provide an indication of what can then be done and energization of LEDs 124 and 125 indicate that the collector is hot enough to heat water and the room, respectively.

Referring to FIG. 2, three auxiliary switch closures (identified as AUX 1, AUX 2 and AUX 3) are provided and each is indicative of an optional remote switch closure that can be utilized for providing additional data for programming.

As shown in FIG. 2A, the AUX 3 input is coupled through diode 127 and resistor 128 to the positive input of comparator 130, with the opposite sides of diode 127 being connected with ground through resistors 131 and capacitor 132. In addition, the positive input of comparator 130 is connected with the +12 volt DC power supply through diode 133 and the negative input is connected with the +12 volt DC power supply through resistor 134. In like manner, the AUX 2 input is coupled through diode 136 and resistor 137 to the positive input of comparator 139, with the opposite sides of diode 136 being connected with ground through resistor 140 and capacitor 141. In addition, the positive input of comparator 139 is connected with the +12 volt DC power supply through diode 142 and the negative input is connected with the +12 volt DC power supply through resistor 134. Again in like manner, the AUX 1 input is coupled through diode 144 and resistor 145 to the positive inputs of comparators 147 and 148, with the opposite sides of diode 144 being connected with ground through resistor 150 and capacitor 151. In addition, the positive inputs of comparators 147 and 148 are connected with the +12 volt DC power supply through diode 152 and the negative inputs are connected to the +12 volt DC power supply through resistor 134 and with ground through resistor 153.

The outputs of comparators 130, 139, 147 and 148 are connected with the +12 volts DC power supply and with the positive input through resistors 155 and 156, 157 and 158, and 159 and 160, respectively. In addition, each output is connected with programmable read only memory (PROM) 161 as well as through LED (designated as 162, 162' and 162") and resistor (designated as 163, 163' and 163") to ground. The auxiliary switch closures can accept + DC or AC and either 12 or 24 volts and converts the same to a 0-5 volt logic input to the PROM as well as driving the LEDs (162, 162' and 162"). Energization of the LEDs (162, 162' and 162") indicates switch closure.

As indicated in FIG. 2, PROM 161 receives the indications from the temperature sensors of what can be done (i.e., $T_C$ greater than $T_W$ and $T_C$ greater than $T_R$) along with the indications from the set points of what is desired or needed (i.e., $T_W$ less than $T_{W-SP}$, $T_R$ less than $T_{RH-SP}$, and $T_R$ less than $T_{RL-SP}$) and determines from the information the control to be exerted to cause heat to be most efficiently applied. A truth table to effect the desired end is attached hereto as Appendix 1 and is hereby made a part of this specification.

As shown in FIG. 2B, the outputs D1, D2, D3 and D4 are coupled from PROM 161 with the D1 output being coupled through resistor 165 and to the base of transistor 166, with the D2 output being coupled through resistor 167 to the base of transistor 168, with the D3 output being coupled through resistor 169 to the base of transistor 170, and with the D4 output being coupled through transistor 171 to the base of transistor 172. Transistors 166, 168, 170 and 172 have their emitters connected to ground and their collectors connected with the K1, K2, K3 and K4 outputs, respectively (K1 and K3 are optional outputs), with the K2 and K4 outputs being utilized connected to the K1 and K2 inputs of FIG. 5.

The collector of transistor 166 is connected to one side of LED 175 through resistor 176 (the other side of LED 176 is connected to the +24 volt DC power supply) with resistor 176 and LED 175 having a diode 174 in parallel therewith. The collector of transistor 168 is connected to one side of LED 179 through resistor 180 (the other side of LED 179 is connected to the +24 volt DC power supply) with resistor 180 and LED 179 having a diode 178 in parallel therewith. The collector of transistor 170 is connected to one side of LED 183 through resistor 184 (the other side of LED 183 is connected with the +24 volt DC power supply) with resistor 184 and LED 183 having a diode 182 in parallel therewith. The collector of transistor 172 is connected to LED 187 through resistor 188 (the other side of LED 187 is connected to the +24 volt DC power supply) with resistor 188 and LED 187 having a diode 186 in parallel therewith.

The power supply for the control system is shown in FIG. 2B to include a first integrated circuit 190 providing the +5 volt DC power supply output with integrated circuit 190 having a resistor 191 and capacitors 192 and 194 connected at opposite sides of resistor 191 and to ground, and with the +5 volt DC power supply having a capacitor 193 to ground connected thereto. A second integrated circuit 196 provides the +12 volt DC power supply and has a resistor 197 and capacitors 198 and 199 connected at opposite sides of resistor 197 and to ground, with resistor 197 being connected to a +24 volt DC power supply. The −24 volt DC power supply is connected to resistor 202 having a Zener diode 200 and capacitor 201 to ground connected thereto at opposite sides.

Referring now to FIG. 3, the indications $T_C$, $T_W$, $T_{W-SP}$, $T_R$, $T_{R-SP}$, and $T_{RL-SP}$ are coupled to analog gate 203, the output of which is coupled as the positive input to buffer amplifier 205. The output of amplifier 205 is coupled through resistor 206 as the $V_{in}$ High input to analog-to-digital (A/D) converter 208, which input is connected with ground through resistor 209. The +12 volt DC power supply is connected to one side of a resistive divider to ground, which divider consists of series connected resistors and potentiometers 211, 212, 213, 214 and 215. The variable tap of potentiometer 214 is connected to A/D converter 208 as the $V_{in}$ low input and the center tap of potentiometer 212 is connected to A/D converter 208 as the V-Ref input thereto. A capacitor 216 is connected between the $V_{in}$ High and $V_{in}$ Low inputs to A/D converter 208. A/D convertor 208 also has a capacitor 218 connected between pins 33 and 34, pins 27, 28 and 29 connected through capacitor 219, resistor 220 and capacitor 221, and pins 38, 39 and 40 connected through resistor 222 and capacitor 223. The output of A/D converter 208 is provided to display 225 on a series of lines, as indicated, to provide a visual display, with display 225 having a resistor 226 to ground connected thereto. A/D converter 208 is a voltmetric chip used as an integrating A/D converter and utilizes a ratioed 12 volts as reference so that the displayed output is independent of voltage fluctuations.

An oscillator 228 (a free-running 10 sec oscillator) has pins 9, 10 and 11 connected through capacitor 229, resistor 230 and resistor 231, with the binary output from the oscillator being coupled on pins 1, 2 and 3 to analog gate 203 (as the 1, 2, 4 select inputs to address select inputs A, B and C) and to binary digit driver 232 through resistors 233, 234 and 235, respectively. The output from binary digit driver 232 is connected with LED display 237. LED display 225 displays the temperature indication (of the six input indications shown in FIG. 3) then passed through gate 203 under the control of oscillator 228 (which drives the analog gate to provide a sequential display), and LED 237 displays numerically the indication then being sensed and displayed at LED display 225.

Figure 4:
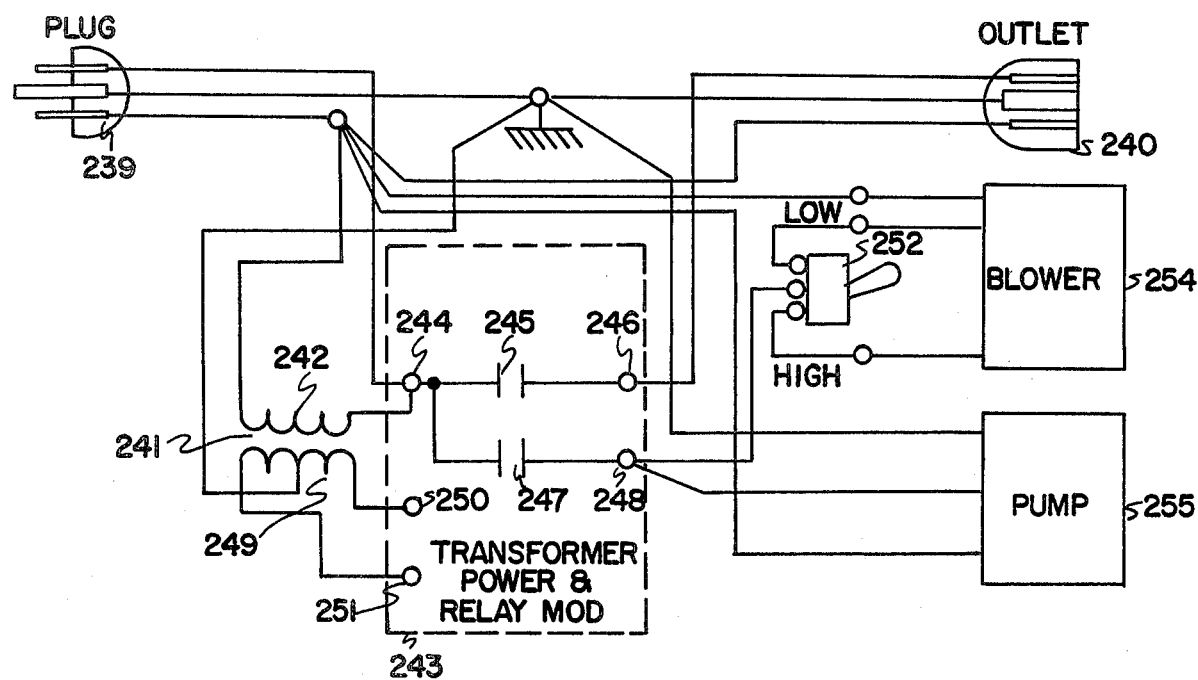
FIG. 4 is a block and schematic diagram of the power supply utilized in the control system of this invention.

Referring now to FIG. 4, a schematic representation is shown of the electrical arrangement for effecting application of heat as controlled by the control system of this invention. As shown, a conventional three prong plug 239 adapts the unit for power from a conventional 115 volt, 60 Hz power supply. One prong of plug 239 and one prong of outlet plug 240 (connected to an air blower—238—for room heating) are conventionally grounded. The two other prongs of plug 239 are connected across the primary winding 242 of transformer 241, with one of these prongs also being connected through transformer power and relay module 243 to one prong of plug 240 (the remaining prong of plugs 239 and 240 are directly connected). In transformer power and relay module 243, junction 244 is connected with power plug 239, and junction 244 is connected through normally open switch 245 to junction 246 (leading to outlet plug 240) and through normally open switch 247 to junction 248 (leading to the water heating control components). The secondary 249 of transformer 241 is connected with junctions 250 and 251 in transformer power and relay module 243, which module is shown in more detail in FIG. 5.

The water heating control units include a high-low switch 252 connected with blower 254 and pump 255, with switch 252 and pump 255 being connected to junction 248.

Figure 5:
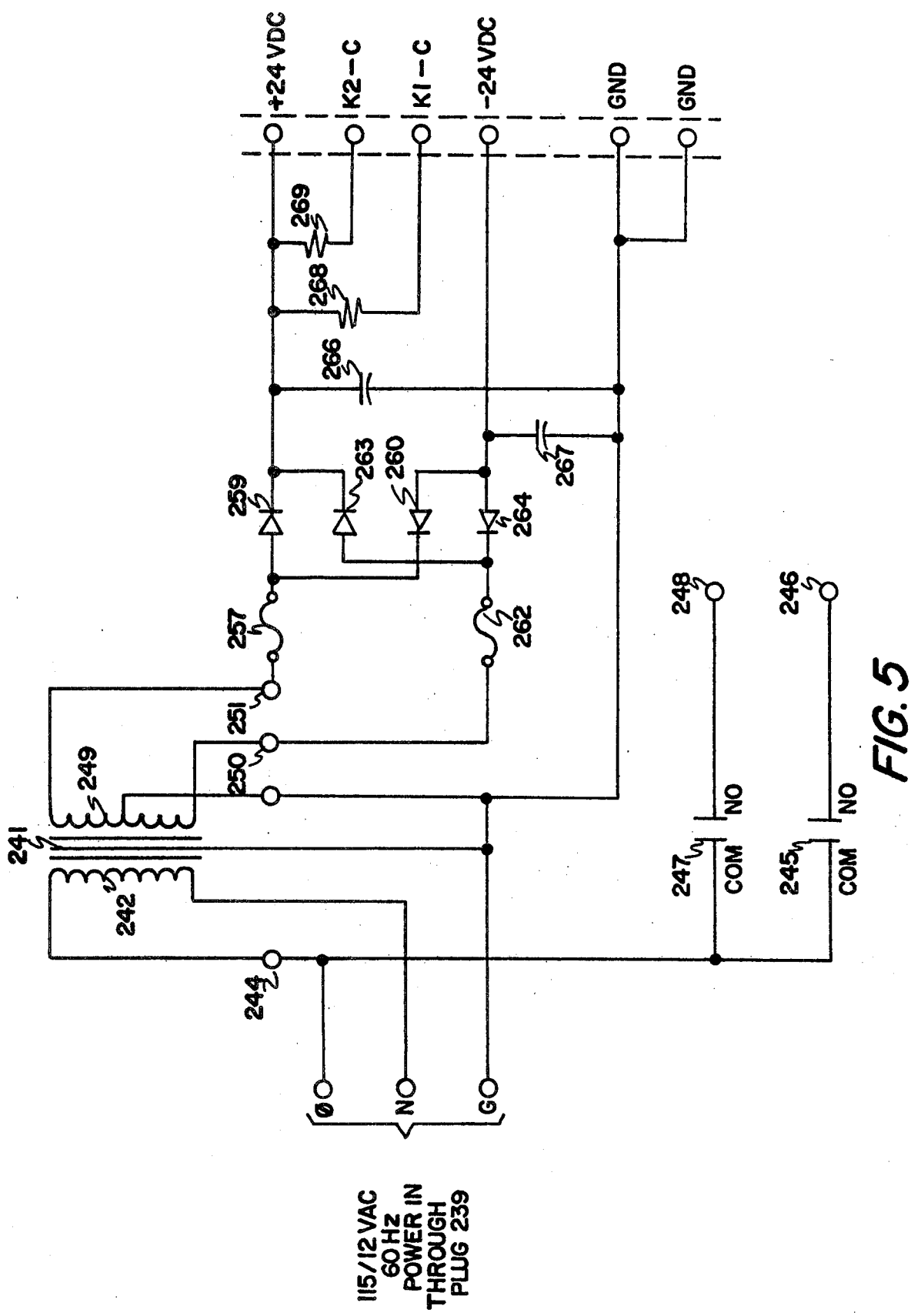
FIG. 5 is a schematic diagram of a portion of the power supply shown in block form in FIG. 4.
Figure 11:
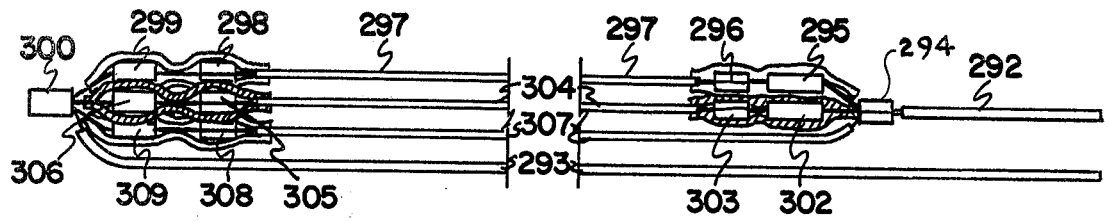
FIG. 11 is a side view layout diagram of a probe utilized to sense the temperature of a solar collector.

Referring to FIG. 5, transformer power and relay module 243 is shown to include a fuse 257 one side of which is connected to junction 251 and the other side of which is connected through diodes 259 and 260 to the +24 volt DC power and −24 volt DC power supply outputs, respectively. In addition, fuse 262 is connected at one side to junction 250 and the other side is connected through diodes 263 and 264 to the +24 volt DC and −24 volt DC power supply outputs, respectively. The +24 volt DC and −24 volt DC power supplies have capacitors 266 and 267, respectively, to ground, and junctions K1 and K2 are connected with the +24 volt DC power supply through relay windings 268 and 269, respectively. Winding 268 controls closing of normally open switch 247 for causing heating of water when winding 268 is engaged to close switch 247, and winding 269 controls closing of normally open switch 245 for causing heating of air when winding 269 is energized to close switch 245.

Referring now to FIGS. 6 through 10, a probe is shown for sensing the temperature of either water or air. As shown in FIG. 6, input leads 271 and 272 are provided with input lead 271 being connected through crimp terminal 274, resistor 276, crimp terminal 277 and thermistor 278 to crimp terminal 279, through crimp terminal 274, resistor 280, through crimp terminal 281 and thermistor 282 to crimp terminal 279, and from crimp terminal 274 and thermistor 284 to crimp terminal 279. Finally, lead 272 is directly connected to crimp terminal 279, with thermistors 278, 282 and 284 and lead 272 being positioned as shown by the cross section view of FIG. 7 taken just behind crimp terminal 279.

As shown in FIG. 8, an insulating heat shrink material 286 and 287 is placed around crimp terminals 279 and 274, respectively, during assembly of the probe, and, as shown in FIG. 9, a metal probe shield 290 having an encapsulant 289 of silicon rubber or epoxy is provided to encapsulate the entire unit from and including crimp terminal 274 to and including crimp terminal 279 so that only leads 271 and 272 extend from the thus encapsulated probe.

FIG. 10 shows the electrical schematic of the probe with lead 271 being connected through resistor 276 to one side of thermistor 278, through resistor 280 to one side of thermistor 282, and directly to one side of thermistor 284, with the three thermistors connected to lead 272 at the other side.

FIGS. 11 through 14 show a probe utilized for sensing the temperature of the solar collector. Leads 292 and 293 are provided with lead 292 being connected through crimp terminal 294, resistor 295, crimp terminal 296, lead 297, crimp terminal 298, and thermistor 299 to crimp terminal 300, through crimp terminal 294, resistor 302, crimp terminal 303, lead 304, crimp terminal 305 and thermistor 306 to crimp terminal 300, and through crimp terminal 294, lead 307 and thermistor 309 to crimp terminal 300, while lead 293 is directly connected to crimp terminal 300.

Figure 12:
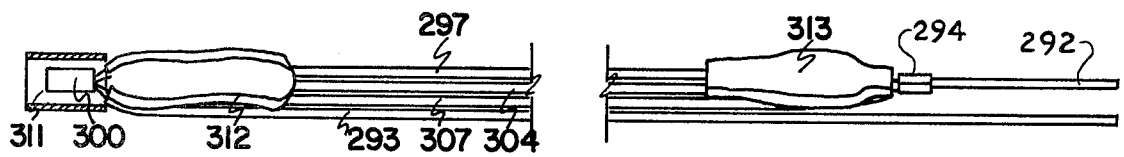
FIG. 12 is a side view of the probe shown in FIG. 11 in a partially assembled state.
Figure 13:
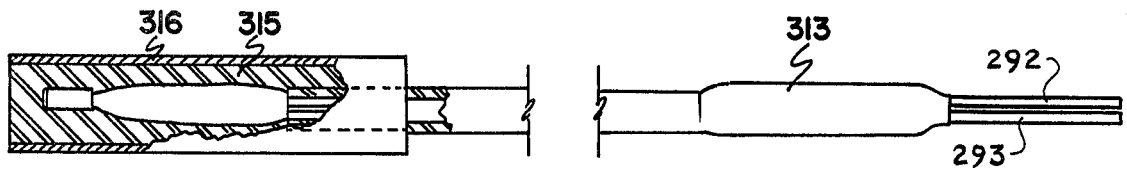
FIG. 13 is a partially cut away side view of the assembled probe as shown in FIGS. 11 and 12.
Figure 14:
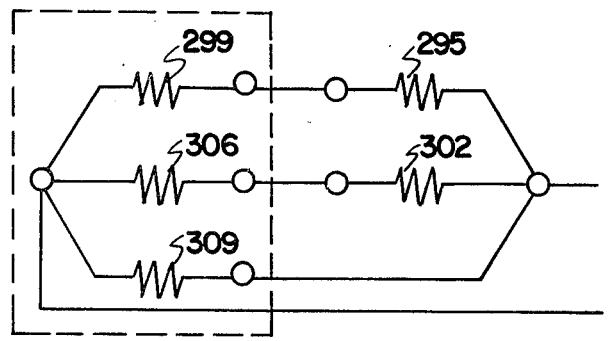
FIG. 14 is an electrical schematic of the probe shown in FIGS. 11 through 13.

As shown in FIG. 12, heat shrink material 311 is placed around crimp terminal 300, and additional heat shrink material 312 and 313 is placed around the resistors and thermistors, after which the front portion is encapsulated as shown in FIG. 13, the front portion being covered by a metal probe shield 316 with encapsulant 315 therein in the same manner as discussed with respect to the probe shown in FIGS. 6 through 10. With respect to the probe shown in FIG. 13, however, only crimp terminal 300, thermistors 299, 306 and 309, and crimp terminals 298, 305 and 308 are included within probe shield 316. FIG. 14 is an electrical schematic of the probe shown in FIGS. 11-13 and shows resistor 295 and thermistor 299 connected in parallel with resistor 302 and thermistor 306, and also in parallel with thermistor 309.

Figure 15:
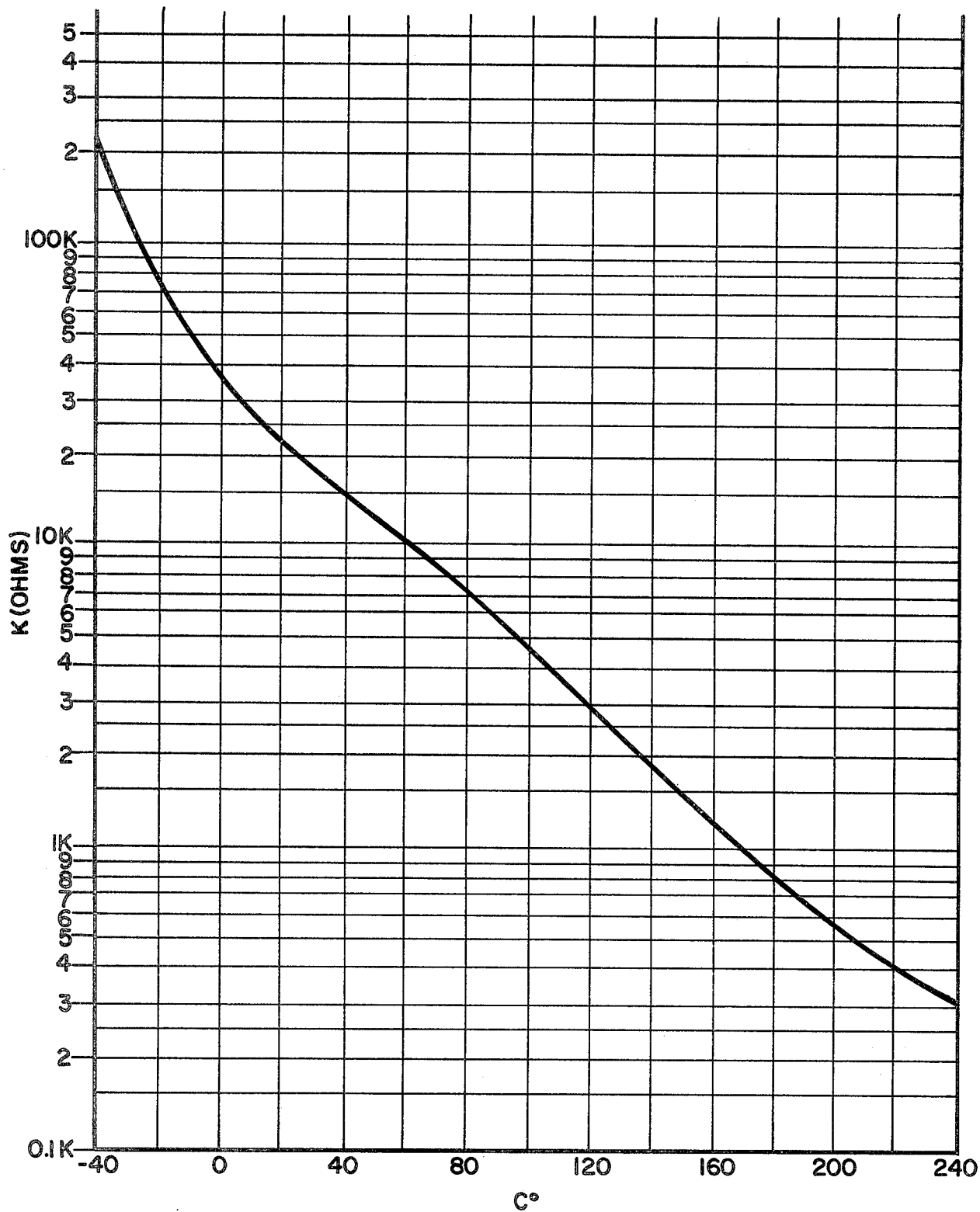
FIG. 15 is a graph illustrating a typical temperature-resistance curve of the probes of this invention showing the non-linearity of the resistance offered by the probe.

The curve shown in FIG. 15 is a resistance/temperature response curve to show the non-linearity of the resistance of the temperature probes over a temperature range.

In a working embodiment of this invention, the following components were utilized, it being realized that the components listed are by way of example and the invention is not meant to be limited to the components as listed:

Resistors: 29,30 & 31—270; 33—30K; 34 & 35—270K; 37, 39 & 41—100K; 44, 45 & 46—10K; 48—18K; 49 & 50—110K; 59—10K; 60—133K; 63—10K; 64—133K; 66—10K; 67—66.5K; 70—10K; 71—66.5K; 73—10K; 74—1M; 80 & 85—10K; 89 & 90—1M; 92, 94, 96, 98, 100 & 102—300; 106—4.12K; 107—2K; 108—2.49K; 112 & 113—2K; 117—5.11K; 118—2K; 119, 120 & 121—10K; 123 & 126—300; 128—200K; 131—2K; 134—1K; 137—200K; 140—2K; 145—200K; 150, 153 & 155—2K; 156—1M; 157—2K; 158—1M; 159—2K; 160—1M; 163—2K, 163' & 163"—300; 165, 167, 169 & 171—1K; 176, 180, 184 & 188—3.9K; 191 & 197—6.2; 206—2K; 209—1K; 211—22K; 212—0 to 100; 213—1K; 214—0 to 100; 215—1K; 220—100K; 226—150; 230—20K; 231—100K; 233, 234 & 235—100K; 276—47.5K; 280—30.1K; 295—47.5K; and 302—30.1K.

Capacitors: all—0.1 μF except 199 & 201—47 μF; 233—100PF; 266—470 μF; and 267—47 μF.

Diodes: all—IN4148 except 174, 178, 182, 186, 259, 260, 263 and 264—IN4004.

Zener Diode 200—IN751(5.2 V).

Thermistors: 278 & 299—P1H103; 282 & 306—P1H203; and 284 & 309—P1H104.

LEDs: all—MV5023.

LED Displays: 225—MAN73A 3×MAN71A; and 237—MAN74A.

PROM 161: DM74S287N.

Transistors: 166, 168, 170 & 172—2N2222.

Differential Amplifiers: all—LM324N except 104, 110, 115, 122, 130, 139, 147 & 148—LM339N.

Analog Gate: 203—CD4051.

Integrated Circuits: 190 & 196—LM304T.

Oscillator: 228—CD4060.

Binary Digit Driver: 232—MC14495.

A/D Converter: 208—7107.

Figure 16:
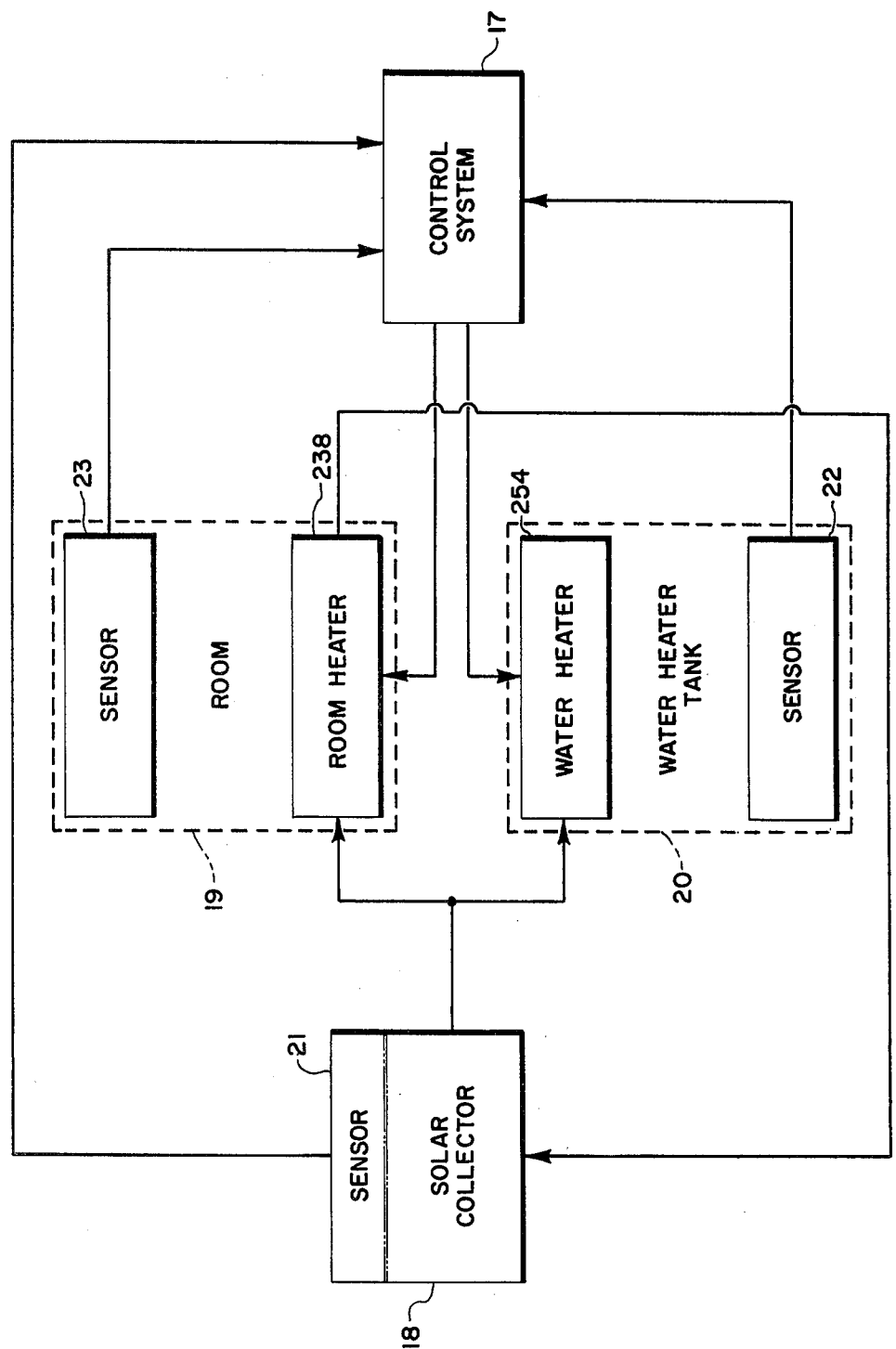
FIG. 16 is a block diagram illustrating the use of the control system to control heating of a room heater and water heater by heat generated at a solar collector.

Control system 17 is shown in FIG. 16 to be connected with sensors 21, 22 and 23 (associated with solar collector 18, room 19 and water heater tank 20, respectively) to receive inputs therefrom for determining the heat availability at the solar collector and the heat needs of the room and water heater tank. Control system 17 is also connected to room heater 238 and water heater 254 to cause heating, where available and needed, as brought out more fully hereinabove.

In operation, the set points are manually set at the front panel of the control unit, and the user can identify at the front panel both the availability of heat from the collector to heat air and water, as well as whether heat is needed for water and/or air by watching identifying LED displays. In addition, the user can determine the sensed temperature of each indication as identified by number with a digital readout of each being sequentially displayed at the front panel. Operation of the control system is automatic as brought out hereinabove.

As can be appreciated from the foregoing, this invention provides an improved control system and method that are particularly useful for control of solar energy.

APPENDIX I

PROM TRUTH TABLE

Addresses

| | |
|---|---|
| A0 | T room colder than room high set point |
| A1 | T water colder than water set point |
| A2 | Option 3 |
| A3 | Option 2 |
| A4 | T room colder than room low set point |
| A5 | Option 1 |
| A6 | T collector hotter than T room |
| A7 | T collector hotter than T water |

Data

| | |
|---|---|
| 0 | Everything off |
| 1 | Not used |
| 2 | heat air |
| 3 | not used |
| 4 | not used |
| 5 | not used |
| 6 | not used |
| 7 | not used |
| 8 | heat water |
| 9 | not used |
| A | Heat air and water (optional program only) |
| B | not used |
| C | not used |
| D | not used |
| E | not used |
| F | not used |

| ADD | DATA | ADD | DATA | ADD | DATA | ADD | DATA |
|---|---|---|---|---|---|---|---|
| 00 | 0 | 20 | 0 | 40 | 0 | 60 | 0 |
| 01 | 0 | 21 | 0 | 41 | 2 | 61 | 0 |
| 02 | 0 | 22 | 0 | 42 | 0 | 62 | 0 |
| 03 | 0 | 23 | 0 | 43 | 0 | 63 | 0 |
| 04 | 0 | 24 | 0 | 44 | 0 | 64 | 0 |
| 05 | 0 | 25 | 0 | 45 | 2 | 65 | 0 |
| 06 | 0 | 26 | 0 | 46 | 0 | 66 | 0 |
| 07 | 0 | 27 | 0 | 47 | 0 | 67 | 0 |
| 08 | 0 | 28 | 0 | 48 | 0 | 68 | 0 |
| 09 | 0 | 29 | 0 | 49 | 2 | 69 | 0 |
| 0A | 0 | 2A | 0 | 4A | 0 | 6A | 0 |
| 0B | 0 | 2B | 0 | 4B | 0 | 6B | 0 |
| 0C | 0 | 2C | 0 | 4C | 0 | 6C | 0 |
| 0D | 0 | 2D | 0 | 4D | 2 | 6D | 0 |
| 0E | 0 | 2E | 0 | 4E | 0 | 6E | 0 |
| 0F | 0 | 2F | 0 | 4F | 0 | 6F | 0 |
| 10 | 0 | 30 | 0 | 50 | 2 | 70 | 0 |
| 11 | 0 | 31 | 0 | 51 | 2 | 71 | 0 |
| 12 | 0 | 32 | 0 | 52 | 2 | 72 | 0 |
| 13 | 0 | 33 | 0 | 53 | 2 | 73 | 0 |
| 14 | 0 | 34 | 0 | 54 | 2 | 74 | 0 |
| 15 | 0 | 35 | 0 | 55 | 2 | 75 | 0 |
| 16 | 0 | 36 | 0 | 56 | 2 | 76 | 0 |
| 17 | 0 | 37 | 0 | 57 | 2 | 77 | 0 |
| 18 | 0 | 38 | 0 | 58 | 2 | 78 | 0 |
| 19 | 0 | 39 | 0 | 59 | 2 | 79 | 0 |
| 1A | 0 | 3A | 0 | 5A | 2 | 7A | 0 |
| 1B | 0 | 3B | 0 | 5B | 2 | 7B | 0 |
| 1C | 0 | 3C | 0 | 5C | 2 | 7C | 0 |
| 1D | 0 | 3D | 0 | 5D | 2 | 7D | 0 |
| 1E | 0 | 3E | 0 | 5E | 2 | 7E | 0 |
| 1F | 0 | 3F | 0 | 5F | 2 | 7F | 0 |
| 80 | 0 | A0 | 0 | C0 | 0 | E0 | 0 |
| 81 | 0 | A1 | 0 | C1 | 2 | E1 | 0 |
| 82 | 8 | A2 | 0 | C2 | 8 | E2 | 0 |
| 83 | 8 | A3 | 0 | C3 | 8 | E3 | 0 |
| 84 | 0 | A4 | 0 | C4 | 0 | E4 | 0 |
| 85 | 0 | A5 | 0 | C5 | 2 | E5 | 0 |
| 86 | 8 | A6 | 0 | C6 | 8 | E6 | 0 |
| 87 | 8 | A7 | 0 | C7 | 8 | E7 | 0 |
| 88 | 0 | A8 | 0 | C8 | 0 | E8 | 0 |
| 89 | 0 | A9 | 0 | C9 | 2 | E9 | 0 |
| 8A | 8 | AA | 0 | CA | 8 | EA | 0 |
| 8B | 8 | AB | 0 | CB | 8 | EB | 0 |
| 8C | 0 | AC | 0 | CC | 0 | EC | 0 |
| 8D | 0 | AD | 0 | CD | 2 | ED | 0 |
| 8E | 8 | AE | 0 | CE | 8 | EE | 0 |
| 8F | 8 | AF | 0 | CF | 8 | EF | 0 |
| 90 | 0 | B0 | 0 | D0 | 2 | F0 | 0 |
| 91 | 0 | B1 | 0 | D1 | 2 | F1 | 0 |
| 92 | 8 | B2 | 0 | D2 | 2 | F2 | 0 |
| 93 | 8 | B3 | 0 | D3 | 2 | F3 | 0 |
| 94 | 0 | B4 | 0 | D4 | 2 | F4 | 0 |
| 95 | 0 | B5 | 0 | D5 | 2 | F5 | 0 |
| 96 | 0 | B6 | 0 | D6 | 2 | F6 | 0 |
| 97 | 0 | B7 | 0 | D7 | 2 | F7 | 0 |
| 98 | 0 | B8 | 0 | D8 | 2 | F8 | 0 |
| 99 | 0 | B9 | 0 | D9 | 2 | F9 | 0 |
| 9A | 8 | BA | 0 | DA | A | FA | 0 |
| 9B | 8 | BB | 0 | DB | A | FB | 0 |
| 9C | 0 | BC | 0 | DC | 2 | FC | 0 |
| 9D | 0 | BD | 0 | DD | 2 | FD | 0 |
| 9E | 0 | BE | 0 | DE | A | FE | 0 |
| 9F | 0 | BF | 0 | DF | A | FF | 0 |

We claim:

1. A solar energy control system, comprising:
first means adapted to provide an indication of availability of heat derived from a solar collector;
second means adapted to provide separate indications of heat needs at each of a plurality of defined areas, said defined areas including a room and a water heater; and
processing means for receiving said indications from said first and second means and responsive thereto providing control outputs for enabling application of heat, when indicated to be available from solar energy, to said defined areas indicating heat needs, said processing means including determining means for causing heat to be applied at any given time to that one of said defined areas that enhances the efficiency of said solar collector and for controlling the application of heat to said defined areas needing heat consistent with heat availability so that water in said water heater is caused to be heated prior to heating of air in said room when said water is sensed to be colder than said air and sufficient heat is available at said solar collector to heat said water.

2. The control system of claim 1 wherein said first means includes electronic means for receiving indications of sensed temperatures at said solar collector and providing a linear voltage output indicative thereof.

3. The control system of claim 2 wherein said first means includes non-linear temperature measuring means connected with said electronic means to provide said indication of sensed temperatures thereto.

4. The control system of claim 1 wherein said second means includes electronic means for receiving indications of sensed temperatures at said plurality of defined areas and providing separate linear voltage outputs indicative thereof.

5. The control system of claim 4 wherein said second means includes non-linear temperature measuring means connected with said electronic means to provide said indications of sensed temperatures from said plurality of defined areas to said electronic means.

6. The control system of claim 1 wherein said system includes display means for displaying at least indications of heat availability and indicated needs.

7. The control system of claim 1 wherein said system includes means for sensing actual and desired temperatures at said defined areas and display means for displaying indications of said sensed and desired temperatures at said defined areas.

8. The control system of claim 7 wherein said system includes means for sequential display of said indications of sensed actual and desired temperatures.

9. A solar energy control system, comprising:
first means adapted to provide an indication of availability of heat derived from solar energy;
second means adapted to provide separate indications of temperatures sensed and desired at each of a plurality of defined areas; and
processing means for receiving said indications from said first and second means and responsive thereto providing differential control outputs for enabling efficient application of heat, when indicated to be available from solar energy, to said defined areas indicating a sensed temperature less than the desired temperature for that defined area, with said heat being applied at any given time only to the one of said defined areas then indicating the lowest sensed temperature that is below at least one indicated desired temperature for that defined area.

10. The control system of claim 9 wherein said processing means includes memory means for receiving said indications from said first and second means and responsive thereto determining which of said defined areas has said lowest sensed temperature that is below at least one indicated desired temperature for that defined area and causing heat to be applied thereto if sufficient heat is sensed to be available from solar energy.

11. The control system of claim 10 wherein said first and second means includes means for providing a linear output voltage as a function of sensed temperature, and wherein said processing means includes comparator means for providing outputs to said memory indicative of heat needs at said defined areas and heat availability with respect to said defined areas.

12. The control system of claim 9 wherein said system includes display means for displaying at least indications of heat availability and sensed heat needs.

13. The control system of claim 9 wherein said system includes first display means for sequentially displaying a plurality of indications including sensed and desired temperatures, and sequencing means for sequentially causing said temperatures to be displayed.

14. The control system of claim 13 wherein said system includes a second display means for displaying an indication of the temperature then being displayed at said first display means.

15. The control system of claim 13 wherein said system includes analog-to-digital converter means for receiving an analog input signal indicative of temperature and converting the same to a digital signal for display in a digital form by first display means.

16. The control system of claim 15 wherein said analog-to-digital converter means receives a ratiod input reference voltage so that said output is independent of voltage fluctuations with respect to said analog input signal.

17. The control system of claim 9 wherein said first means includes a probe for sensing the temperature of a solar collector deriving heat from solar energy, wherein said second means includes a pair of probes for sensing temperatures in a room and in a water heater, and wherein said processing means includes means to control the application of heat to air in said room and water in said water heater.

18. A solar energy control system, comprising:
first probe means for sensing the temperature at a solar collector and providing a linear voltage output as a function of sensed temperature;
second probe means for sensing the temperature of water in a water heater and providing a linear voltage output as a function of sensed temperature;
third probe means for sensing the temperature of air in a room and providing a linear voltage output as a function of sensed temperature;
first comparator means for comparing said voltage output from said second probe means and said voltage output from said first probe means and providing an output when the temperature at said solar collector exceeds that of said water in said water heater;
second comparator means for comparing said voltage output from said third probe means said voltage output from said first probe means and providing an output when the temperature at said solar collector exceeds that of said air in said room;
first, second and third temperature setting means for establishing a desired temperature for said water in said water heater and high and low desired temperatures for said air in said room, respectively, and providing voltage outputs indicative thereof;
third comparator means for comparing said voltage outputs from said first temperature setting means and said second probe means and providing an output indicative of a need for heat to raise the temperature of said water in said water heater to said desired water temperature;
fourth comparator means for comparing said voltage outputs from said second temperature setting means and said third probe means and providing an output indicative of a need for heat to raise the temperature of said air in said room to said desired high room temperature;
fifth comparator means for comparing said voltage outputs from said third temperature setting means and said third probe means and providing an output indicative of a need for heat to raise the temperature of said air in said room to said desired low room temperature;
memory means for receiving said outputs from said comparator means and responsive thereto providing a control output for effecting heating of said water and air in a predetermined manner depending upon sensing of heat availability and needs to satisfy desired temperatures; and
means for receiving said control output and, responsive thereto, directing heat to said water and room air as directed by said memory means.

19. The control system of claim 18 wherein said memory means is a programmable read only memory.

20. The control system of claim 19 wherein said programmable read only memory causes available heat to be applied first to said water if the temperature of said water is sensed to be below that of said air, then applied to said air when sufficient heat is sensed to be available to heat said air, then again applied to said water when said air has been raised in temperature to said low room air desired temperature and retained thereat, and then applied to said air to raise the temperature of said air to said high room air desired temperature.

21. The control system of claim 18 wherein said system includes first, second, third, fourth, fifth and sixth display means for displaying outputs from said first, second, third, fourth and fifth comparator means and said memory means, respectively.

22. The control system of claim 18 wherein said system includes analog gate means connected with said first, second and third probe means and with said first, second and third temperature setting means to receive said voltage outputs therefrom, analog-to-digital converter means, oscillator means for causing sequential gating of said voltage outputs recieved by said analog gate means to said analog-to-digital converter means, and digital display means connected with said analog-to-digital converter means to sequentially display said temperature indications gated through said analog gate means.

23. The control system of claim 22 wherein said system includes a resistive divider network connected between a DC power source and ground to provide a ratiod voltage input to said analog-to-digital converter means, and wherein said analog-to-digital converter means provides an output to said display means that is independent of voltage fluctuations occurring in said power source.

24. The control system of claim 22 wherein said system includes a second digital display means connected with said oscillator means to provide a digital display relating to the temperature indications then being displayed by said digital display means connected with said analog-to-digital converter means.

25. A method for controlling heat from solar energy, said method comprising:
sensing the temperature of a solar collector, water in a water heater, and air in a room;
providing an indication of desired water temperature in said water heater, and high and low desired air temperatures in said room;
determining from said sensed temperatures and indications of desired temperatures the availability of heat from the solar collector and the heat needs of said water heater and room; and
applying heat to said water heater and said room as necessary and consistent with heat availability to efficiently heat said water and air by stages to said desired temperatures.

26. The method of claim 25 wherein said water and air are sequentially heated when heat is available from said solar collector.

27. The method of claim 25 wherein said water is initially heated when sensed to be at a temperature less than that of said air, said air is heated to said low desired room air temperature when said solar collector temperature is sensed to be sufficient to heat said air, said water is heated to said desired water temperature after said air is heated to said low desired room air temperature and maintained thereat, and said air is heated to said high desired room air temperature after said water has been heated to said desired water temperature.

28. The method of claim 27 wherein said heating cycle is repeated whenever an indicated need for heat is sensed and said heat is sensed to be available from said solar collector.

* * * * *